United States Patent
Kishida

(10) Patent No.: US 7,938,610 B2
(45) Date of Patent: May 10, 2011

(54) LOCK NUT

(75) Inventor: Daisaku Kishida, Osaka (JP)

(73) Assignee: Kyo-Ei Industrial Corporation, Osaka-shi (JP)

( * ) Notice: Subject to any disclaimer, the term of this patent is extended or adjusted under 35 U.S.C. 154(b) by 389 days.

(21) Appl. No.: 12/102,246

(22) Filed: Apr. 14, 2008

(65) Prior Publication Data

US 2009/0016847 A1 Jan. 15, 2009

(30) Foreign Application Priority Data

Jul. 9, 2007 (JP) ................................. 2007-179497
Oct. 9, 2007 (JP) ................................. 2007-007719

(51) Int. Cl.
*F16B 37/16* (2006.01)
(52) U.S. Cl. ........................ 411/429; 411/910
(58) Field of Classification Search ................ 411/429, 411/432, 374, 910
See application file for complete search history.

(56) References Cited

U.S. PATENT DOCUMENTS

| 533,338 | A | * | 1/1895 | Bagley | 301/114 |
| 972,140 | A | * | 10/1910 | Adam | 411/429 |
| 4,170,918 | A | * | 10/1979 | Burge | 411/427 |
| 4,302,137 | A | * | 11/1981 | Hart | 411/432 |
| 5,391,028 | A | * | 2/1995 | Charles | 411/374 |
| 5,797,659 | A | * | 8/1998 | Fuller | 301/35.623 |
| 6,017,177 | A | * | 1/2000 | Lanham | 411/410 |

FOREIGN PATENT DOCUMENTS

| GB | 2 128 282 A | 4/1984 |
| JP | 3125160 | 8/2006 |
| WO | WO 98/27344 | 6/1998 |

OTHER PUBLICATIONS

European Search Report issued Feb. 1, 2011 in European patent application EP 08 00 7518.

* cited by examiner

*Primary Examiner* — Flemming Saether

(74) *Attorney, Agent, or Firm* — Oblon, Spivak, McClelland, Maier & Neustadt, L.L.P.

(57) ABSTRACT

A special shape inner peripheral surface connected to a base end side of a female thread and set to be rotatable only by a first special purpose tool is formed in a nut main body. A cap is constituted by a shaft portion which is inserted to the special shape inner peripheral surface of the nut main body and having a male thread threaded with a base end portion of the female thread of the nut main body in a leading end side, and a head portion provided in a base end side of the shaft portion.

5 Claims, 5 Drawing Sheets

LOCK NUT

BACKGROUND OF THE INVENTION

1. Field of the Invention

The present invention relates to a lock nut having a high anti theft performance in which a fastening operation and a loosening operation can not be carried out by a normal general-purpose tool or a general tool, in a nut used in various fields in addition to a lock nut of a wheel for a motor vehicle.

2. Description of the Related Art

A lot of lock nuts in which a fastening work and a loosening work can not be carried out without using a special purpose tool have been proposed for various fields, and have provided for an actual use. For example, in order to prevent the theft of motor vehicle wheels, there has been proposed a lock nut which can be rotated only by a pair of special purpose tools (refer to Utility Model No. 3125160).

In addition to a performance for preventing the theft, a durability against a rust or the like is necessary for this kind of lock nut, and it is an object to improve them.

SUMMARY OF THE INVENTION

An object of the present invention is to provide a lock nut in which a durability is improved as well as a performance for preventing a theft is improved.

In accordance with the present invention, there is provided a lock nut including a hollow nut main body in which a female thread is formed in a leading end side of an inner peripheral surface, and a cap put on a top portion of the nut main body, wherein a special shape inner peripheral surface which is rotatable only by a special purpose tool is formed in a top portion side of the inner peripheral surface of the nut main body, and the cap is constituted by a shaft portion which is inserted to the special shape inner peripheral surface of the nut main body and having a male thread threaded with a base end portion of the female thread of the nut main body in a leading end side, and a head portion which is provided in a base end side of the shaft portion and closing a top opening of the nut main body.

The special shape of the nut main body is provided in the inner peripheral surface, whereby the theft preventing performance is improved in comparison with a case that the special shape is provided in an outer peripheral surface. Further, it is possible to improve the durability against the rust or the like by the cap.

Further, a double lock structure generated by the nut main body and the cap is obtained by making the cap rotatable only by a second special purpose tool, and the theft preventing performance is further improved.

The cap may be structured such as to be rotatable by a general tool (a hexagonal spanner, a screw driver or the like). In this case, an engagement portion provided in the head portion of the cap is formed, for example, as a hexagonal hole corresponding to the hexagonal spanner, however, is not limited to this.

It is preferable that the head portion of the cap does not protrude to an outer side in an axial direction from the top portion of the nut main body.

It is preferable that a taper-shaped collar (ring member) which is changed in conformity to a shape of a bolt insertion hole is rotatably and inseparably attached to a leading end portion of the nut main body.

In accordance with the lock nut of the present invention, since the cap is put on the top portion of the nut main body, the durability against the rust is increased, and since the special shape of the nut main body is provided in the inner peripheral surface, the theft preventing performance is improved in comparison with the case that the special shape is provided in the outer peripheral surface.

Further, in a structure in which a special shape engagement surface for being set rotatable only by the second special purpose tool is formed in the top surface of the head portion of the cap, it is necessary to detach the cap by the first special purpose tool and detach the nut main body by the second special purpose tool for detaching the lock nut. Therefore, a higher theft preventing performance can be obtained by the double lock.

DETAILED DESCRIPTION OF THE PREFERRED EMBODIMENTS

A description will be given below of embodiments in accordance with the present invention with reference to the accompanying drawings. In the following description, a right side in FIG. 5 is called as a leading end side, and a left side in FIG. 5 is called as a base end side.

FIGS. 1 to 5 show a first embodiment of a lock nut in accordance with the present invention.

A lock nut 1 is formed as a three-piece structure including a hollow nut main body 2 in which a female thread 11 is formed in an inner peripheral surface leading end side, a taper-shaped collar (a ring member) 3 rotatably attached to a leading end portion of the nut main body 2, and a cap 4 put on a top portion (a base end side end portion) of the nut main body 2.

Figure 1:
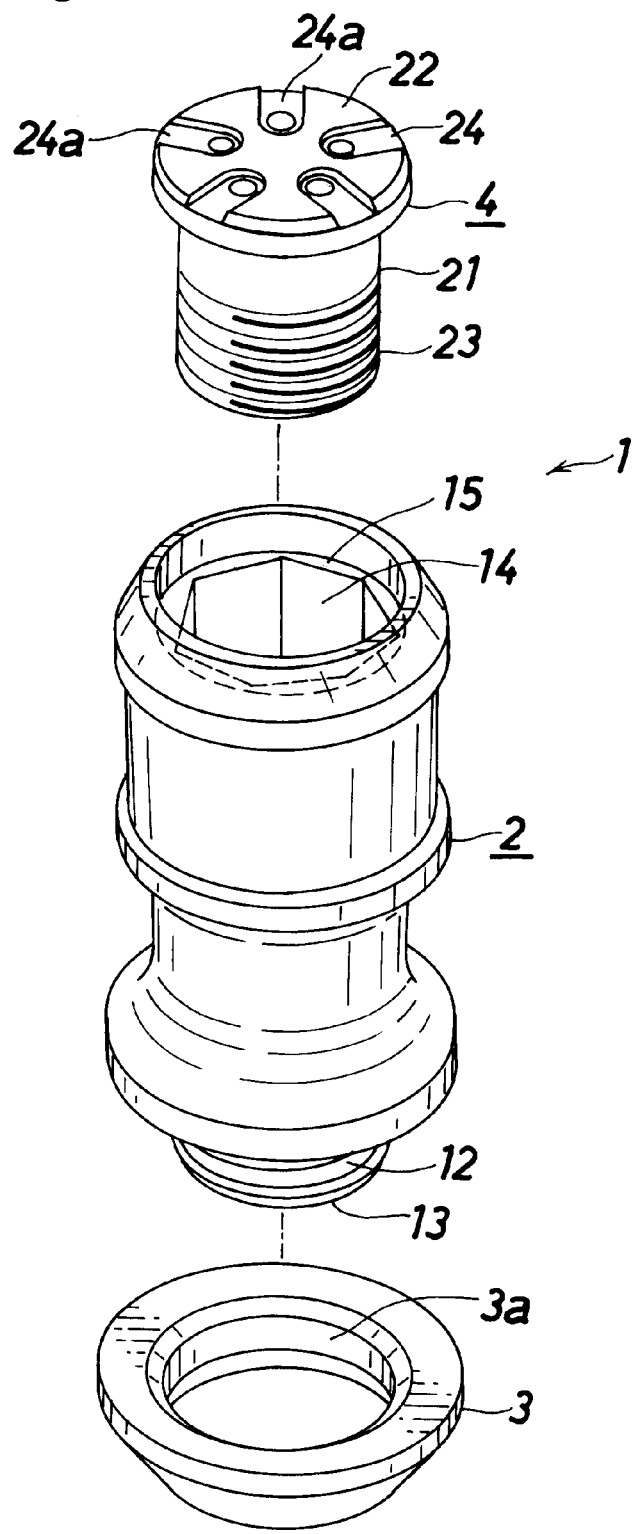
FIG. 1 is an exploded perspective view showing a first embodiment of a locknut in accordance with the present invention.
Figure 2:
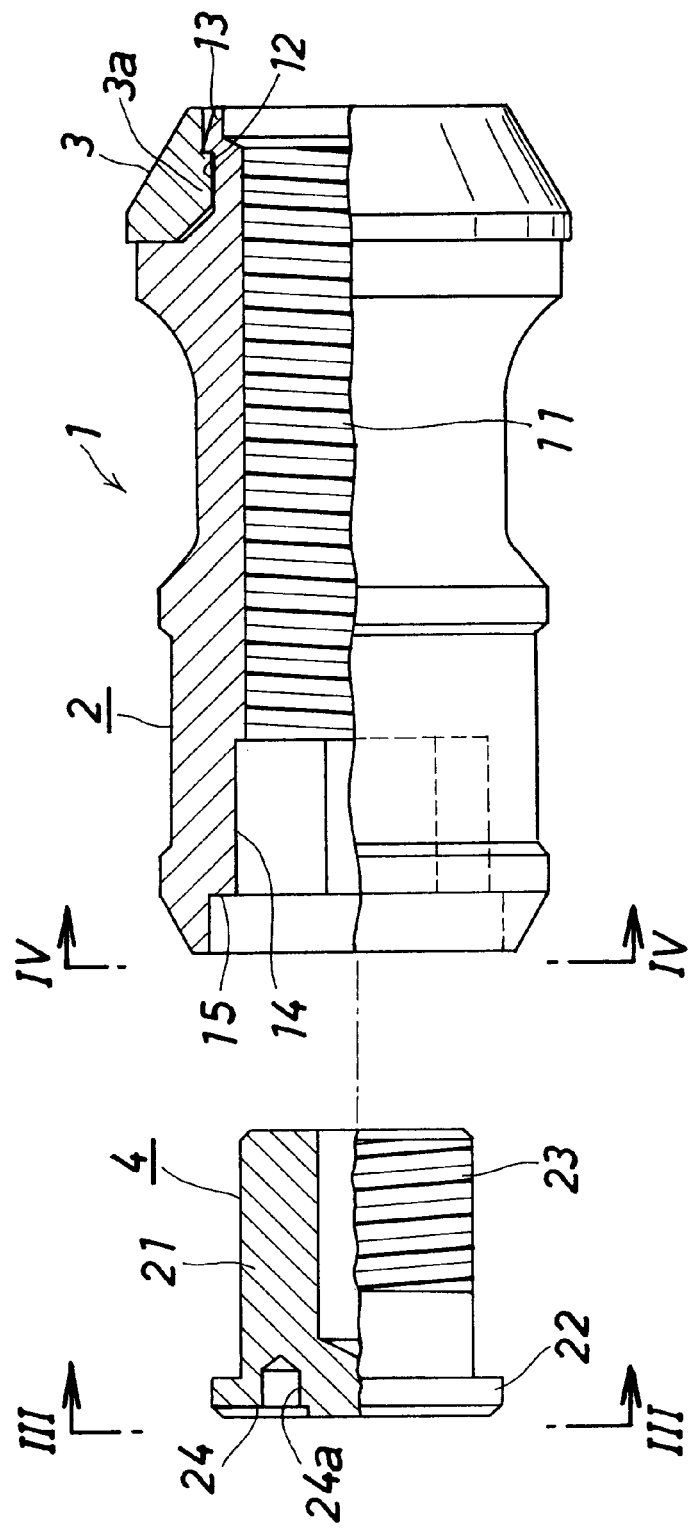
FIG. 2 is a cross sectional view showing the first embodiment of the lock nut in accordance with the present invention.
Figure 3:
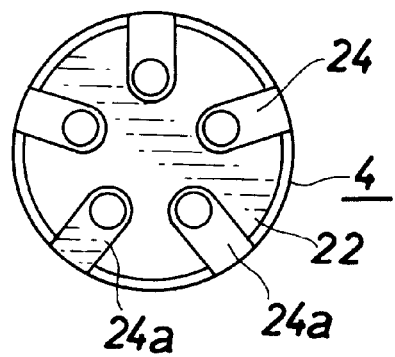
FIG. 3 is a cross sectional view along line III-III in FIG. 2.
Figure 4:
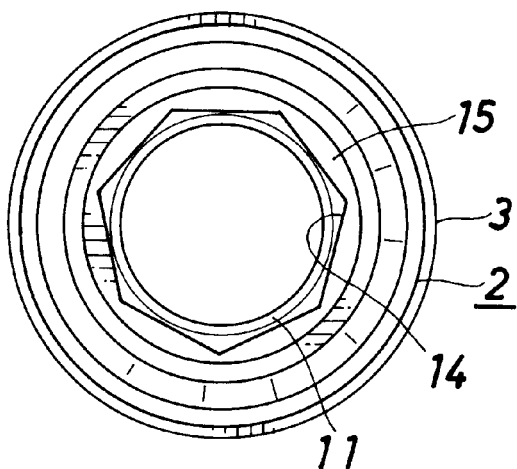
FIG. 4 is a cross sectional view along line IV-IV in FIG. 2.
Figure 5:
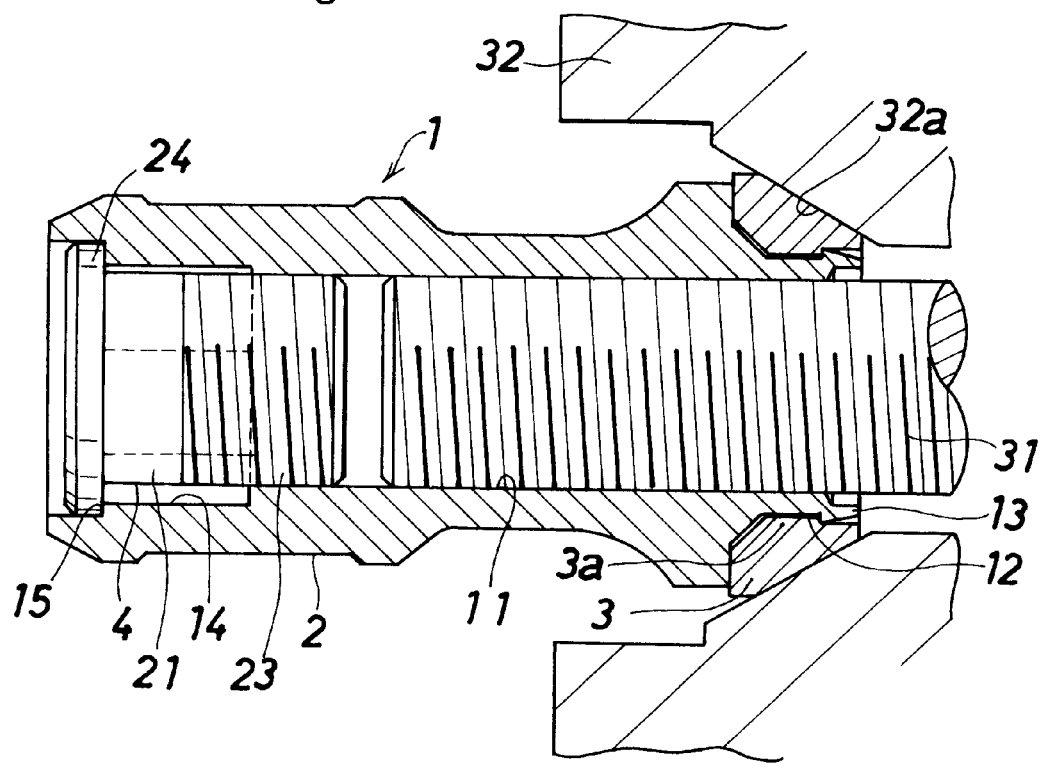
FIG. 5 is a cross sectional view showing a used state of the lock nut in accordance with the present invention.

As shown in FIG. 5, the female thread 11 of the nut main body 2 is threaded with a hub bolt 31 of a motor vehicle, and the taper-shaped collar 3 is brought into contact with a peripheral edge portion of a bolt insertion hole 32a formed in a wheel 32 for the motor vehicle. A length of the female thread 11 is obtained by adding a length for threading the cap 4 to a length threaded with the hub bolt 31 of the motor vehicle.

The taper-shaped collar 3 has an annular protruding portion 3a in an inner periphery, and is rotatably and inseparably attached to the nut main body 2 by being forcibly fitted to an annular groove 12 provided in the leading end portion of the nut main body 2 from a leading end side. The leading end portion 13 of the nut main body 2 is formed as a taper shape having a small thickness for easily fitting the taper-shaped collar 3 forcibly. It is possible to adapt to various wheels 32 without changing the nut main body 2 and the cap 4, by changing an outer peripheral shape of the taper-shaped collar 3 in conformity to a shape of a bolt insertion hole 32a formed in the wheel 32 for the motor vehicle and setting the ring member having various shapes without being limited to the taper shape.

An outer peripheral surface of the nut main body 2 is formed as a stepped cylindrical surface, and is formed as a shape which is easily held by a hand. However, this shape corresponds to a shape which can not be rotated due to slip, in a case of being rotated by a tool such as a pliers.

A special shape inner peripheral surface 14 connected to a base end side of the female thread 11 and being rotatable only by a first special purpose tool (not shown) is formed in a top portion side of an inner peripheral surface of the nut main body 2. An inner diameter of the inner peripheral surface 14 is made larger than an inner diameter of the female thread 11. The special shape inner peripheral surface 14 is formed as a polygonal columnar shape (a scalene heptagonal shape in an illustrated example), and can not be rotated by a normal tool such as a hexagonal spanner or the like. Further, since the special shape is formed in the inner peripheral surface 14, a possibility of the rotation by the tool such as the pliers which is feared in the case that the special shape is formed in the outer peripheral surface comes to zero.

The cap 4 is constituted by a shaft portion 21 inserted to the special shape inner peripheral surface 14 of the nut main body 2 and having a male thread 23 threaded with the base end portion of the female thread 11 of the nut main body 2 in a leading end side, and a head portion 22 provided in a base end side of the shaft portion 21 and closing a top opening of the nut main body 2.

A diameter of the shaft portion 21 is smaller than the special shape inner peripheral surface 14 of the nut main body 2. Accordingly, it is possible to thread the male thread 23 of the shaft portion 21 with the female thread 11 of the nut main body 2 without interfering with the shaft portion 21.

The head portion 22 is received by a step portion 15 provided in the top portion of the nut main body 2 so as to be prevented from protruding to the outer side in the axial direction from the top portion of the nut main body 2.

A special shape engagement surface 24 for being rotatable only by a second special purpose tool (not shown) is formed in a top surface of the head portion 22, whereby a double lock structure is formed in conformity with the special shape inner peripheral surface 14 of the nut main body 2. In this case, the special shape engagement surface 24 of the cap 4 is illustrated by the example in which five concave portions 24a are provided at an appropriate interval, however, is not limited to this. It goes without saying that the special shape engagement surface may be variously changed.

In accordance with the lock nut 1 of the present invention, the cap 4 is threaded with the nut main body 2 by the second special purpose tool after strongly fastening the nut main body 2 to the hub bolt 31 by the first special purpose tool. Even if the cap 4 can be detached by some kind or another way, the nut main body 2 can not be detached in the same manner. Accordingly, an extremely firm double lock structure is formed.

Figure 6:
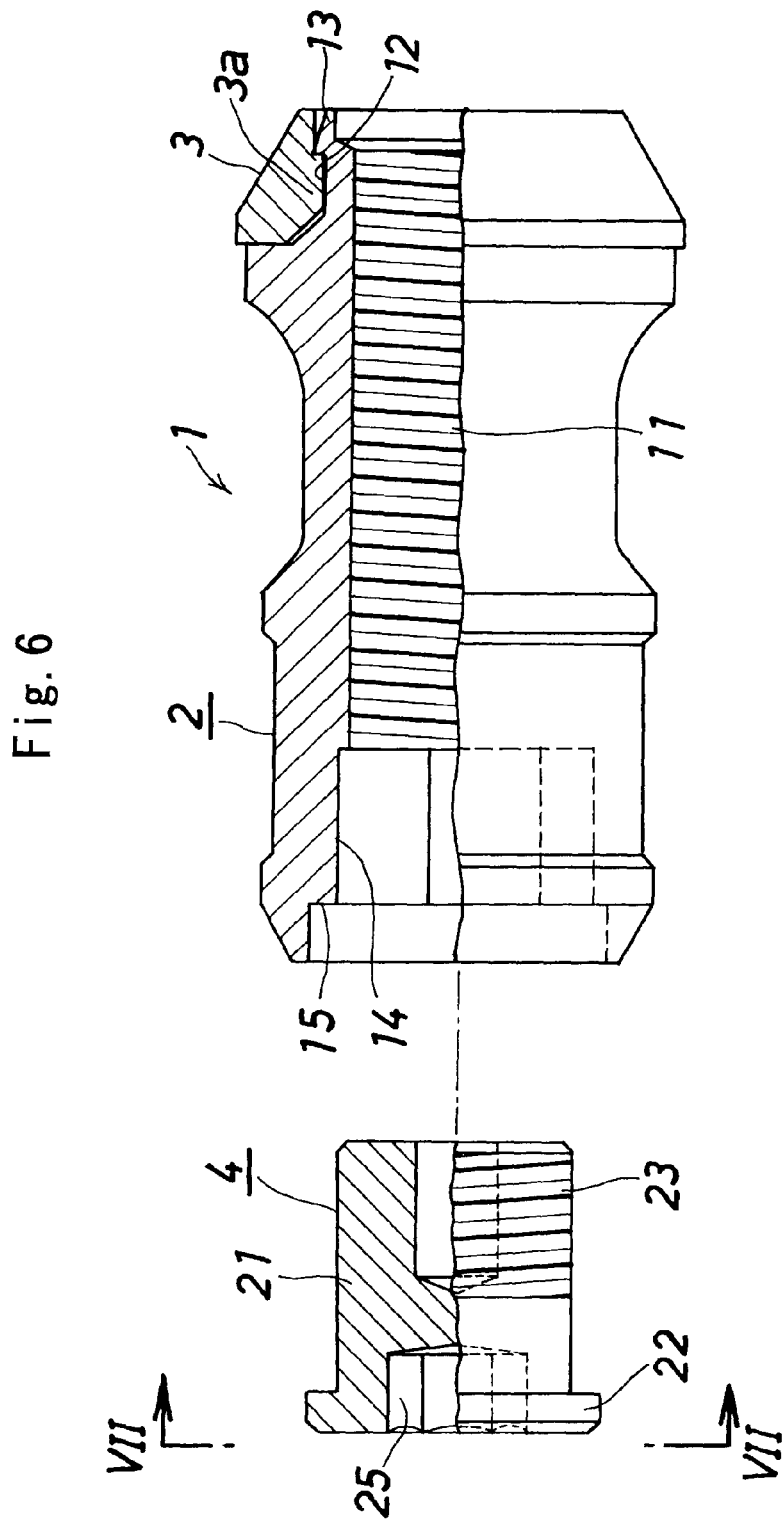
FIG. 6 is across sectional view showing a second embodiment of the lock nut in accordance with the present invention.
Figure 7:
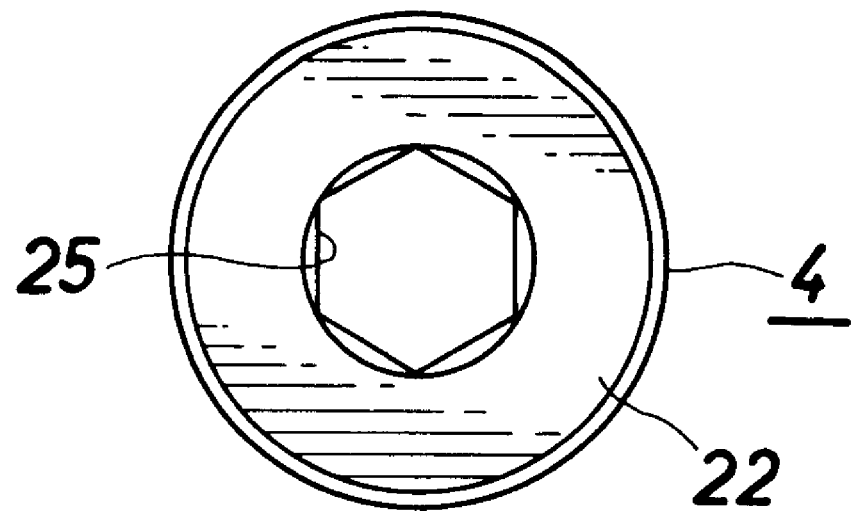
FIG. 7 is a cross sectional view along line VII-VII in FIG. 6.

In the structure mentioned above, since the special shape 14 of the nut main body 2 is provided in the inner peripheral surface, the theft preventing performance is improved in comparison with the case that the special shape is provided in the outer peripheral surface. Accordingly, even if the cap 4 is structured such as to be rotatable by the normal tool (the wrench, the hexagonal spanner, the screw driver or the like), it is possible to improve the durability as well as it is possible to improve the theft preventing performance in comparison with the conventional structure. One example (a second embodiment) is shown in FIGS. 6 and 7. In the following description, the same reference numerals are attached to the same structures as those of the first embodiment, and a detailed description thereof will not be repeated.

As shown in FIG. 6, a lock nut 1 in accordance with the second embodiment is formed as a three-piece structure including a nut main body 2 in which a female thread 11 is formed in an inner peripheral surface leading end side, a taper-shaped collar (a ring member) 3 which is rotatably attached to a leading end portion of the nut main body 2, and a cap 4 which is put on a top portion (a base end side end portion) of the nut main body 2.

The lock nut 1 in accordance with the second embodiment is different from the first embodiment only in an engagement portion formed in a head portion 22 of the cap 4. A hexagonal hole 25 as shown in FIGS. 6 and 7 is formed in place of the special shape engagement surface 24 in accordance with the first embodiment in the head portion 22 of the cap 4. Accordingly, the cap 4 can be fastened and detached by a commercially available hexagonal spanner. Therefore, it is preferable to prepare only one special purpose tool, and it is easy to attach and detach the lock nut 1.

What is claimed is:

1. A lock nut, comprising:
   a hollow nut main body including a female thread formed in a leading end side of an inner peripheral surface thereof; and
   a cap disposed on a top portion of the nut main body,
   wherein a special shape inner peripheral surface which is rotatable only by a special purpose tool is formed in a top portion side of the inner peripheral surface of the nut main body, and
   the cap includes:
      a shaft portion inserted into the special shape inner peripheral surface of the nut main body,
      a male thread threaded with a base end portion of the female thread of the nut main body in a leading end side thereof, and
      a head portion provided in a base end side of the shaft portion and that closes a top opening of the nut main body.

2. The lock nut as claimed in claim 1, wherein a special shape engagement surface that is rotatable only by a second special purpose tool is formed in a top surface of the head portion of the cap.

3. The lock nut as claimed in claim 1, wherein an engagement portion that is rotatable is formed in the head portion of the cap.

4. The lock nut as claimed in claim 3, wherein the engagement portion formed in the head portion of the cap is a hexagonal hole corresponding to a hexagonal spanner.

5. The lock nut as claimed in any one of claims 1 to 4, wherein a taper-shaped ring member that conforms with a shape of a bolt insertion hole is rotatably and inseparably attached to the leading end portion of the nut main body.

* * * * *